United States Patent Office 3,027,572
Patented Apr. 3, 1962

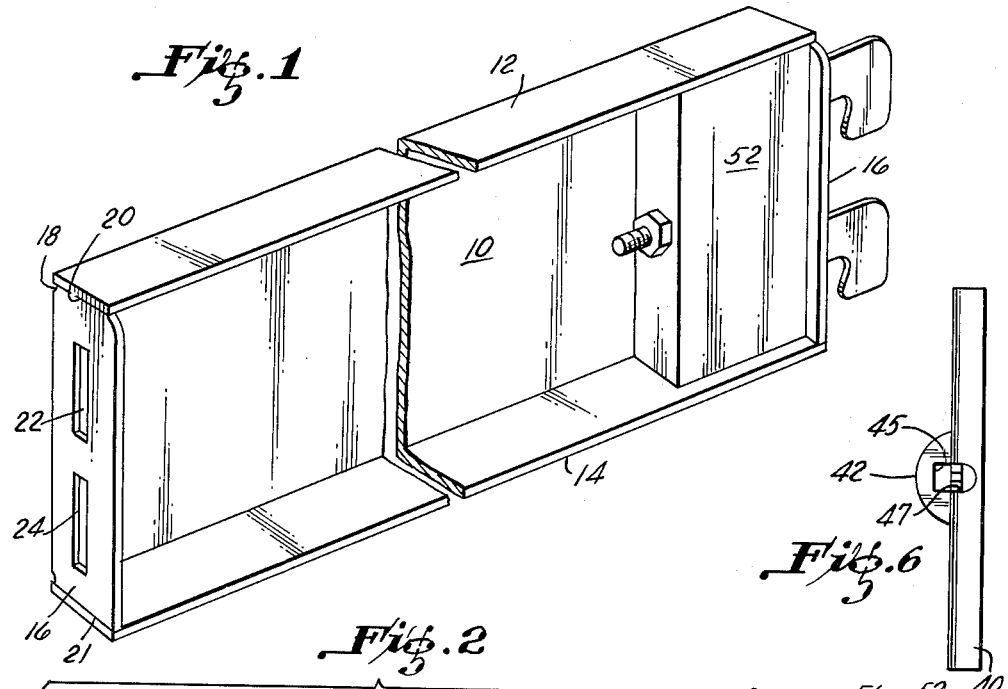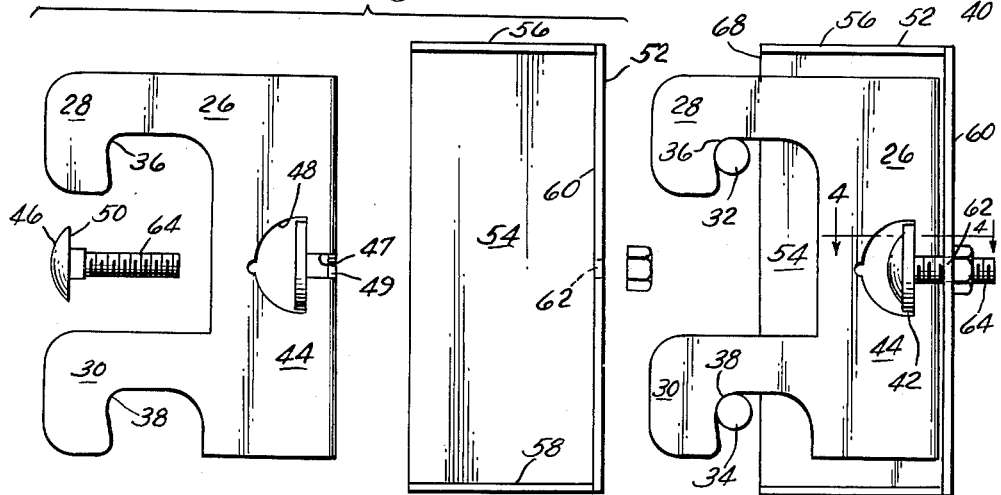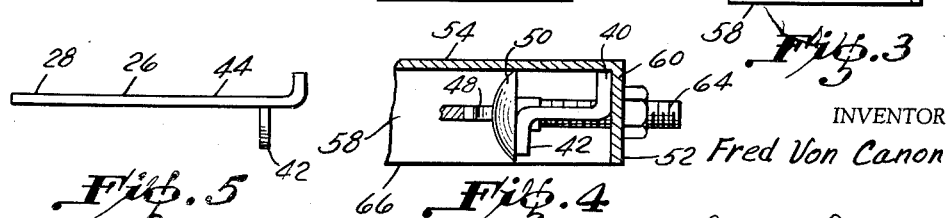

1

3,027,572
BED RAIL AND CONNECTOR STRUCTURE
Fred Von Canon, % Sanford Furniture Co.,
Sanford, N.C.
Filed Sept. 9, 1959, Ser. No. 838,902
13 Claims. (Cl. 5—296)

This invention relates to bed rails and means for connecting the rails to head and foot boards.

The invention more particularly relates to a metal bed rail and associated connector structure.

Bed rails have been made with metal and wood for many years. Usually metal rails are for the mass produced medium grade furniture, although they are generally apt to be more satisfactory than wooden rails in so far as structural considerations are concerned. They can be made rigid, will not warp and they are less likely to deform or bend or twist in service. The connector structure employed with the rails is obviously an important part of their design. The connectors must provide a secure method of attaching the rails to the head and foot boards, yet it is also obviously desirable that this structure be as simple as possible.

The instant invention which particularly relates to the connector and rail end structure for metal bed rails has as one of its objects the provision of a structure which can be produced at less cost than the heretofore known types.

Prior known connector structures employed with metal rails requires welding during assembly. This necessitates a certain minimum thickness of rail regardless of strength requirements as well as the expense of welding. Riveting is also used on prior bed construction. However, riveting is found on spring frames and in all instances the elements must be of sufficient thickness to support the rivets without them tearing out. Thus if connectors were riveted to metal side rails the latter would also have to be thick enough to support the rivets. Accordingly one of the objects of the instant invention is to provide connector structure wherein no welding or riveting need be employed and whereby relatively thin metal can be used as compared with that necessary for welding or riveting.

A still further object of the invention is to provide a connector rail end structure which can be formed with the minimum amount of metal.

Still another object of the invention is to provide a metal bed rail having an end flange adapted to be brought into bearing relation with a head or foot board, and connector means adapted to extend therethrough, and means for properly positioning the connector means relative to the flange to facilitate attachment and adjustment.

Still another object of the invention is to provide a pair of connector elements formed of sheet steel having means for spacing the elements properly within a bed rail, and means for adjusting the latter which is of an extremely simple nature, and will greatly reduce the cost and facilitate use.

A further object of the invention is to provide a means for enclosing the connector structure at the end of the rails so as to prevent the collection of dust and provide a neat finished end which will not tear bedding.

A further object of the invention is to provide connector means and screw type adjustment means and an enclosure for the connecting means which prevents the collection of dirt and functions in positioning of the connector means.

Yet another object of the invention is to provide connector structure as set forth above having a commonly available bolt type adjustment means and extremely simple inexpensive means for preventing rotation of the bolt so that adjustment may be readily achieved.

It is also an object of the invention to provide a connector means having a flanged end cooperable with a housing, and a bolt means extending into a web of the connector, and which connector means has a bolt support and antirotation means formed as an integral part thereof.

Another object of the invention is to provide a connector as set forth in the preceding object wherein the flange and bolt support means cooperate with a housing in positioning the connector within a housing and the housing is formed and adapted to cooperate with the flanges and web of a bed rail for positioning the pin connecting elements of the connector and housing properly in relation to the rail for attachment to a head or foot board.

It is still a further object of the invention to provide a structure as set forth in the preceding object wherein the housing and connector are readily movable in a simply formed flanged bed rail and can be slid into operative position as a unit, and wherein rigid entirely satisfactory connection of the rail is thus achieved.

A further object of the invention is to provide a bed rail and connector end support involving projectable connecting elements which can be slid to an inoperative non-projecting position as a unit for packaging and shipping and then simply slid into operative position manually when ready for use.

These and other objects and advantages will become apparent from the following description and the accompanying drawing wherein:

FIGURE 1 is a perspective view of a rail and connector structure in accordance with the invention.

FIGURE 2 is an exploded side elevational view of the connector unit.

FIGURE 3 is a side elevational view showing the elements of FIGURE 2 in assembled relationship.

FIGURE 4 is a fragmentary sectional view taken along 4—4 of FIGURE 3.

FIGURE 5 is a top view of a connector member.

FIGURE 6 is an end view of the connector member.

As indicated heretofore the instant invention provides a rail structure at a cost lower than that previously obtainable yet it provides advantages also not found in the prior structures. One is the full enclosure of the connector structure so as to prevent snagging and elimination of the accumulation of dirt. Another is the provision of a single adjustment means for paired connectors, which is simple, easy to operate and cannot become disengaged inadvertently, and still another is the provision for decreased size for packaging.

Further, the instant invention prevents a rattle-free extremely rigid connector end structure. In fact rigidity of the instant structure compares to that previously obtained only through use of much heavier stock and welding. Although welding can be employed in the instant invention it is not needed due to the structure.

Referring now more particularly to the drawing:

The bed rail, according to the instant invention, comprises a web 10, a top flange 12 and a bottom flange 14. The rail further has end plates 16. These end plates are formed by bending the ends of the webs laterally. The rail is pierced at the points of bending to reduce stress. The end plates are bent inwardly so as to extend in between the ends of the flanges 12 and 14 (see where indicated by reference numerals 20 and 21). The end plates are provided with upper and lower slots 22, 24. These slots are vertically aligned and extend laterally through the end plates.

The connector means used with the rail includes a housing described below and a connector plate member 26. The plate member 26 is provided with a pair of hook-like connector legs 28 and 30 adapted to cooperate with bed pins such as 32 and 34. The pins are receivable within the recesses 36 and 38 in the connector legs, as is known in the art. The connector plate 26 is of a width such that it can be received within the slots in the head and foot boards and be pressed downwardly over the pins.

The connector plate member also has an end flange 40 laterally offset from the "web" of the connector at the end opposite the legs 28 and 30. The connector plate member further has a bolt stop 42. The latter is formed by cutting the plate member web 44 and bending out the cutout portion as indicated by the drawing. The bolt stop is provided with a square cut-out 45 adapted to cooperate with the square shank of a standard stove bolt 46. The end flange 40 is cut out on a circular radius in alignment with the squared slot 45 and a portion 47 of the web 44 is also cut out in alignment therewith to receive the shank of the stove bolt. The bolt stop cutout 48 in plate 26 is of a size to receive the head of the bolt 50. The cutout portion 47 which is provided in the flange 44 has its side walls positioned laterally with respect to the side walls of the cutout 44 so that when the bolt head is seated in the latter cutout, the bolt shank will bear against the walls of the cutout 47 and be positioned substantially laterally of the flange 40 with the bolt head bearing securely against the stop 42. The shank of the bolt will also cooperate with the cutout 49 in the flange 40 to extend the bolt shank laterally of flange 40.

The connector housing 52, which is also a connector positioning means, has a web 54, and top and bottom flanges 56 and 58 and an end flange 60. Flange 60 is provided with an opening 62 adapted to receive the shank 64 of the stove bolt 46. This opening is positioned laterally from the web 54 a distance such that when the elements are assembled as in FIGURE 3, the edge of the flange 40 will slidingly bear against the web 54.

The connector plate member is received within the housing and positioning means, while the connector elements extend outwardly of the housing. The side of the flange 40 is adapted to be forced toward the end flange 60 of the housing by tightening of the nut on the bolt 46. If this is done even while the legs 28 and 30 are free and not connected to pins, the cooperation of the flange 40 with the housing 54 will position the connector legs 28 outwardly in parallel spaced relationship with the web 54. The edge of flange 40 cooperates with web 54 to prevent twisting of the connector legs relative to the housing.

The distance between the outer surfaces of the top and bottom flanges 56 and 58 is chosen so that the housing can be received within the flanges 12 and 14 with a close, yet relatively slidable fit and without rocking. Accordingly the housing and its associated connector member when positioned as indicated in FIGURE 1 can be slid within the confines of the upper and lower flanges of the rail. The end 60 of the housing and the flange 40 of the connector plate are sized so that when the inner face 66 of the housing is brought into bearing relationship with the web 10 of the rail the connectors will be in longitudinal alignment with the slots 22 and 24. The unit can thus be inserted into the rail and slid toward the end so as to extend the connectors through the flanges.

Once the connector legs are extended through both ends of the rail they are attached to the bed pins in the usual manner. Then as the nuts of each connector are drawn up the connector housing faces 68 will be drawn against the plates 16 and the latter will be drawn tightly against the bed posts. This will result in a secure rigid interconnection of the head and foot boards. There will be practically no likelihood of squeaking as is in prior known structures.

The close fit between the housing 52 and the bed rail prevents the accumulation of dust. Further, the housing presents a smooth exterior which will not snag bedding.

The insert of the end flanges 16 of the rail between the top and bottom flanges 12 and 14 respectively results in the top and bottom flanges also being brought to bear against the bed posts. This cooperates with the housing 52, which bears against the top and bottom flanges in transferring load directly to the latter. This cooperation of the housing with flanges 12 and 14 as well as the inserting of plates 16 into the flanges prevents twisting of plates 16.

The fact that the connector housing and connectors can be placed inwardly of the rail ends to reduce the rail size for packaging purposes reduces the cost of packaging and shipping. Yet the structure is readily usable; the ultimate user can simply push the connector structures into position. Further, the instant invention provides for adjustment of the rails and secure attachment, together with attractiveness, enclosure of the parts, and absence of projections for tearing bedding.

While I have shown and described a preferred form of my invention, it will be understood that variations in details of form may be made without departure from tht invention as defined in the appended claims.

I claim:

1. In combination, a bed rail and a connector therefor, said rail comprising a web and top and bottom flanges, and a pair of end plates, said end plates and flanges extending laterally of said web, a connector housing having an open end slidingly received between said flanges and adapted to bear against said web and one of said end plates, the latter end plate having connector element receiving openings, a connector member received within said housing and movable therewith, said connector member having connector elements extending outwardly of the open end of said housing, the latter being movable through said openings in said one of said plates upon sliding movement of said housing toward the latter plate, said connector elements being adapted to cooperate with a pair of bed frame pins.

2. The combination set forth in claim 1 including means within said housing cooperating with said connector to position said elements in alignment with said openings in said latter plate while said elements are spaced therefrom during sliding movement of said housing and said elements relative to said plate.

3. The combination set forth in claim 1 including means in said housing cooperating with said elements and said housing to prevent twisting movement of said connector elements with respect to said housing and said rail.

4. In combination, a bed rail having a web, and top and bottom flanges, said flanges facing each other, an end plate extending transversely of said web on the same side thereof as said flanges, a connector housing received within said flanges and having a surface bearing slidingly against said web, a connector member within said housing, said member having connector elements projecting from said housing, said housing being adapted to bear against said plate to form an enclosure for said connector member with said plate and said web, said connector elements being adapted to extend outwardly from said housing and rail end plate and be connected to a bed headboard when said housing is in bearing connection with said plate, and means forming openings in said plate adapted to slidably receive said connector elements.

5. The apparatus of claim 4 including means connecting said connector member to said housing for adjustment of said connector elements transversely of said plate and said housing lengthwise of said rail.

6. The apparatus of claim 5 wherein said adjustment means bears against said housing in a direction parallel said rail to force said housing toward said plate when said connector elements are restrained from inward movement with respect to said plate and said adjustment means is operated to move said plate toward said housing.

7. A bed rail connector comprising a housing, said housing having an open end and a closed side opposite said open end, a pair of flanges extending laterally of said side, said flanges and side forming an edge of said housing, a channel shaped rail, said flanges and side being within the channel of said rail with said edge bearing against said web and said open end facing the end of said rail, said rail having an end plate, a connector member within said housing, said housing bearing against said end plate and forming an enclosure with said end plate, web and first mentioned flanges, a connector member within said enclosure and supported thereby, said connector member having bed pin connector elements extending outwardly of said enclosure and laterally through said plate.

8. A connector for use with a bed rail comprising a plate having a web portion, connector elements formed in one end of said plate, said plate having a flange extending laterally of said web portion, a bolt stop extending laterally of said web portion, means in said bolt stop for receiving a shank of a bolt, the flange of said web portion being cut out in alignment with the latter means to receive the shank of a bolt bearing against said stop.

9. The apparatus of claim 8 wherein the latter means includes means for preventing rotation of a bolt received within said cutout portion.

10. In combination, a connector and connector housing for use in a bed rail, said housing comprising a plate like member having a side projecting laterally of said plate, a pair of flanges projecting laterally of said side and said plate and forming an enclosure with said side and said plate, said housing being open on the end opposite said side, a connector member received within said housing and comprising a plate like member extending generally perpendicular to said side in spaced relationship to the first mentioned plate like member, said connector having a pair of connector elements extending outwardly of said open end of said housing adapted to be connected to bed pins, means within said housing for maintaining said connector and connector elements in a substantially perpendicular relationship with said side, means adjustably connecting said connector to said housing, said connector being adjustable laterally of said side with respect to said housing, said housing and connector being adapted to be slidingly received in a flanged bed rail.

11. The combination of claim 10 including said connector having a flange extending substantially laterally of said connector elements and facing said side, the latter flange being substantially adjacent the first mentioned plate like member and slidable along the latter member.

12. The combination of claim 10 including a bolt stop means attached to said connector, bolt means connected to said stop means and adjustably connected to said side for adjusting said connector relative to said side.

13. The combination of claim 12 wherein said bolt stop means includes bolt anti-rotation means adapted to cooperate with a bolt to prevent rotation thereof relative said connector.

References Cited in the file of this patent

UNITED STATES PATENTS

| | | |
|---|---|---|
| 1,751,037 | Howse | Mar. 18, 1930 |
| 2,227,704 | Collins | Jan. 7, 1941 |
| 2,654,101 | Norris | Oct. 6, 1953 |
| 2,712,138 | Bogar | July 5, 1955 |